(12) United States Patent
Gauthier et al.

(10) Patent No.: US 6,179,302 B1
(45) Date of Patent: Jan. 30, 2001

(54) ADAPTER FOR A DRIVER OF A ROTARY TOOL AND METHOD

(75) Inventors: Michael T. Gauthier, Oak Creek; Kevin K. Marchant, Kenosha, both of WI (US)

(73) Assignee: Beere Precision Medical Instruments, Inc., Racine, WI (US)

( * ) Notice: Under 35 U.S.C. 154(b), the term of this patent shall be extended for 0 days.

(21) Appl. No.: 09/432,452

(22) Filed: Nov. 2, 1999

(51) Int. Cl.⁷ .......................... B23B 31/107; B23B 31/22
(52) U.S. Cl. ............... 279/75; 279/82; 279/905; 285/316; 403/322.2
(58) Field of Search ................... 279/69, 74, 75, 279/81, 82, 904, 905; 403/322.2, DIG. 6; 285/307, 314–316

(56) References Cited

U.S. PATENT DOCUMENTS

| | | | |
|---|---|---|---|
| 2,926,020 | * 2/1960 | Dayton et al. | 279/75 |
| 3,672,692 | * 6/1972 | Fauth | 279/82 |
| 3,708,178 | * 1/1973 | Lauricella | 279/81 |
| 3,893,677 | 7/1975 | Smith . | |
| 3,932,904 | 1/1976 | Nilsson et al. . | |
| 4,577,875 | * 3/1986 | Miyakawa | 279/75 |
| 4,710,079 | 12/1987 | Smith et al. . | |
| 4,878,405 | 11/1989 | Wolfe . | |
| 4,904,001 | * 2/1990 | Sasa et al. | 285/316 |
| 4,904,002 | * 2/1990 | Sasa et al. | 285/316 |
| 5,080,405 | * 1/1992 | Sasa et al. | 285/315 |
| 5,928,241 | 7/1999 | Menut et al. . | |

* cited by examiner

Primary Examiner—Steven C. Bishop
(74) Attorney, Agent, or Firm—Arthur J. Hansmann

(57) ABSTRACT

An adapter for a driver of a rotary tool, and including a pin and slot combination effective between an adapter body and an adapter collar which is slidable on the body. A pin and slot combination guides the sliding and a spring urges the collar with its pin and slot combination into a tool locking position. The slot in the combination is at an acute angle relative to the longitudinal axis of the adapter, and thus it secures the working tool relative to the body and does so by means of a rotary action for the collar which actually also induces the axial movement of the collar for the securing of the tool. The tool has a conical surface oriented opposite to that of a collar conical surface which bears upon the balls for the tool tightening action mentioned. The method of securing the tool is included in the aforementioned.

7 Claims, 2 Drawing Sheets

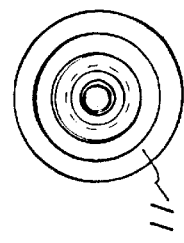
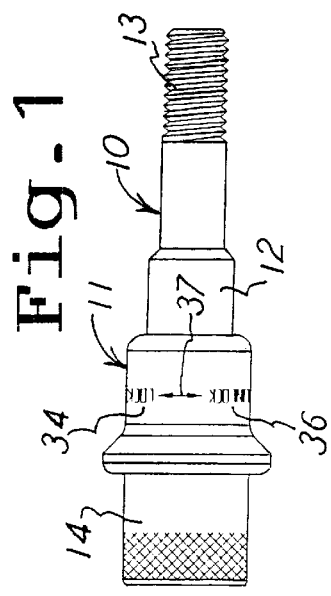
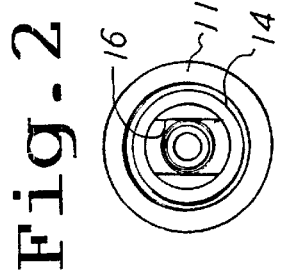
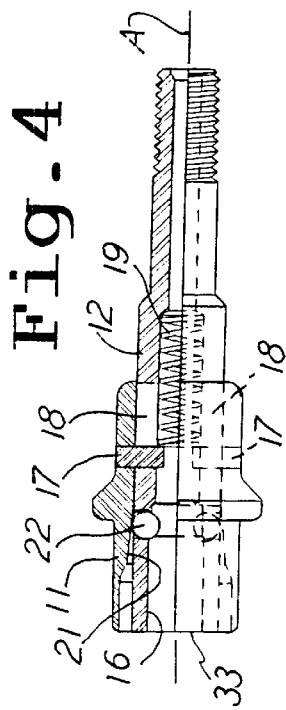
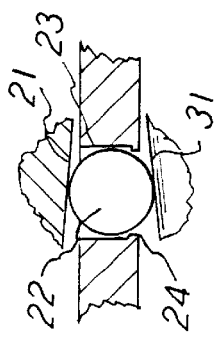
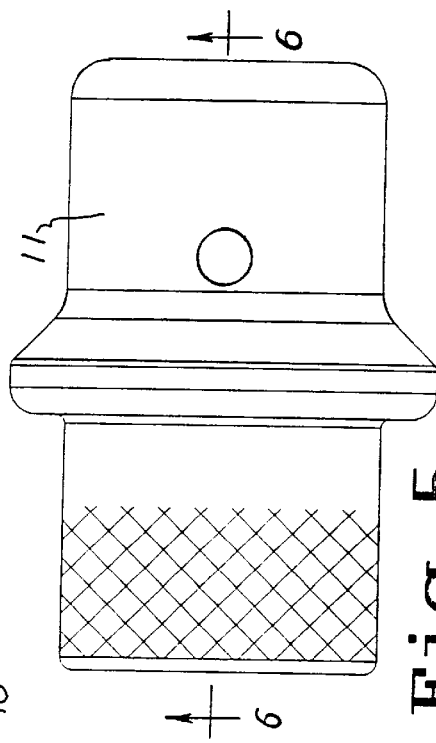
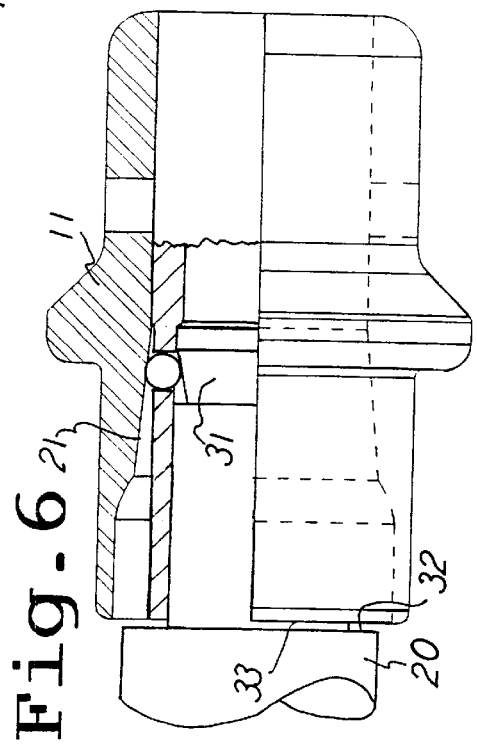

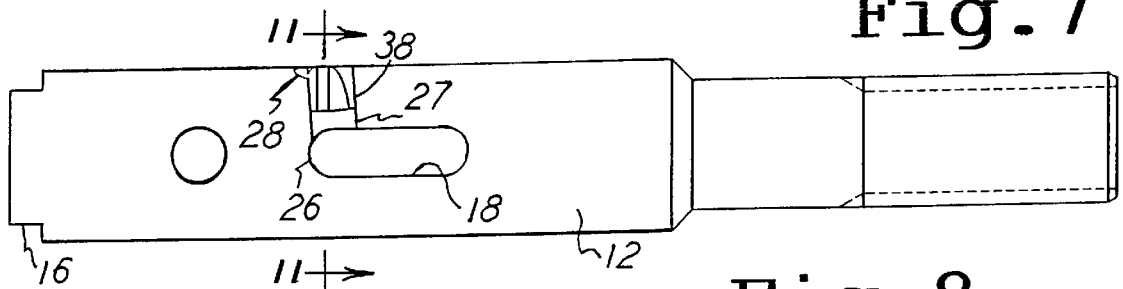
Fig. 7
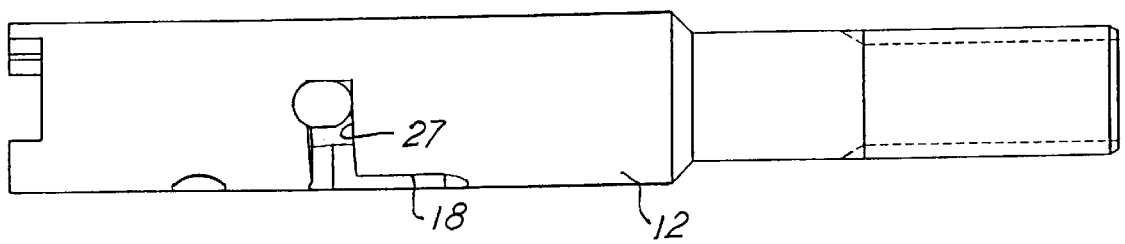
Fig. 8
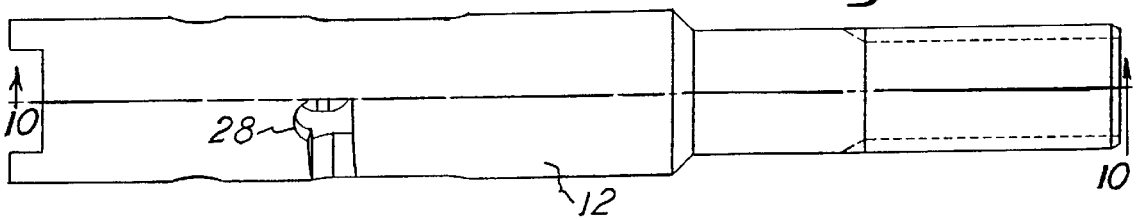
Fig. 9
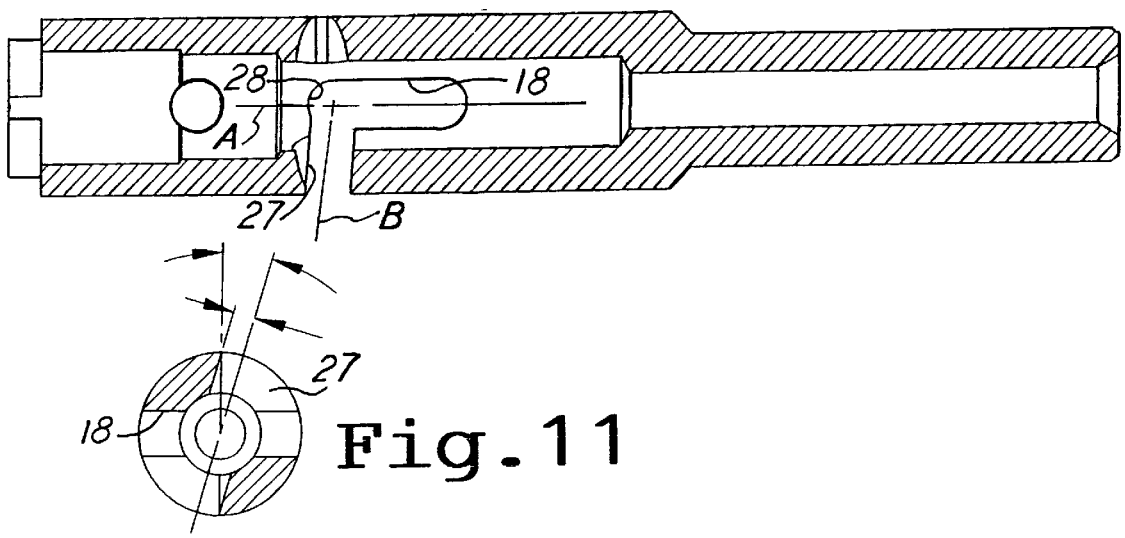
Fig. 10
Fig. 11

ADAPTER FOR A DRIVER OF A ROTARY TOOL AND METHOD

This invention relates to an adapter for a driver of a rotary tool, and, more particularly, it relates to an adapter which securely holds a tool for applying a rotary drive thereto, and it includes the method of doing so.

BACKGROUND OF THE INVENTION

Adapters are already known in the prior art, and the type of the present invention is where there is an adapter driving body which has a slidable collar thereon for quickly securing and releasing a rotary tool in the adapter. Those prior art adapters include the central and elongated driving body which has the sliding collar telescoped thereover and wherein the sliding collar engages a ball which moves radially relative to the collar sliding movement and is thus pressed downward onto the tool for holding the tool in the adapter. A spring is commonly used in that type of adapter, and the spring presses the collar which has a conical interior for pressing radially onto the ball in the tool securing action.

Those prior art adapters also include a pin and slot combination wherein the collar moves axially of the inner driver body for the action of having the collar conical interior slide over the ball for securing the tool and for sliding away from the ball for releasing the tool. The alignment or orientation of that type of prior art slot is commonly parallel to the longitudinal axis of the body and of the coaxially aligned collar itself. That is, the collar slides along the body with a spring pressing the collar in the securing direction and with the operator manually sliding the collar along the body in the direction against the spring for releasing the tool. Even further, the prior art also has the pin and slot combination of the type mentioned and with a branch of the slot disposed at a right angle relative to the longitudinal axis mentioned. In that type of arrangement which is similar to a bayonet pin and slot arrangement, the collar can be axially moved for securing the tool, and the collar can then be rotated into the right-angled branch slot for holding the collar in the secured position.

The present invention improves upon the prior art by having a slot which is disposed at an acute angle relative to the driver longitudinal axis and, as such, the collar is rotated to have the pin move relative to the acutely disposed slot and thereby have the collar move simultaneously in both the axial and rotational directions, all to thereby completely secure the tool in the driver.

That is, upon rotation of the collar on the adapter body, the collar conical surface is advanced toward the ball for further pressing on the ball and thereby further secure the tool in a manner beyond that heretofore achieved.

Still further, the branch slot utilized herein has a notch disposed thereon and the notch receives the pin in a preferred locked position of the pin in the notch, and thus the pin is actually in the slot notch, and a specific maneuver by the operator is required to release the pin from the notch and then rotate the collar to move the collar conical surface away from the ball, all for release of the tool. As such, the tool is securely and also positively and safely held by the adapter and there is no tendency for an inadvertent release of the tool relative to the driver.

Still further, the tool itself is arranged with a conical surface disposed with an orientation in a direction opposite that of the orientation direction for the collar conical surface, and thus, upon securement of the tool, the ball is moved into complete and tight holding relationship with the tool conical surface.

The invention also includes the method for achieving the aforementioned results of the secure holding of the tool and for locking the tool in its position to be driven.

BRIEF DESCRIPTION OF THE DRAWINGS

FIG. 1 is a side elevational view of an adapter of this invention.

FIG. 2 is a left side elevational view of FIG. 1.

FIG. 3 is a right side elevational view of FIG. 1.

FIG. 4 is a view similar to one with the upper part thereof broken away.

FIG. 5 is an enlarged side elevational view of the collar shown in FIG. 1 but in a different rotated position.

FIG. 6 is a view similar to FIG. 5 but basically being a fragmentary sectional view taken along the line 6—6 of FIG. 5 and with a fragment of the tool added thereto.

FIGS. 7, 8, and 9 are side elevational views of the body part of this adapter and showing it from different sides thereof.

FIG. 10 is a sectional view taken on the line 10—10 of FIG. 9.

FIG. 11 is a sectional view taken on the plane 11—11 of FIG. 7.

FIG. 12 is an enlarged fragmentary sectional view similar to a portion of FIG. 6.

DETAILED DESCRIPTION OF THE PREFERRED EMBODIMENT AND METHOD

The following description predominantly refers to the actual construction of the preferred adapter, however, it will be readily seen and understood that the method is also disclosed by that description and as presented herein.

FIGS. 1 and 2 show the adapter having a cylindrical and elongated body 10 and a cylindrical collar 11 telescopically disposed on the body 10 and it is slidable and rotatable on the body cylindrical surface designated 12. The body has a longitudinal axis designated "A" extending therethrough, and the collar 11 shares that same longitudinal axis and is of course coaxially disposed with the body 10. One end 13 of the body 10 may be attached to an unshown rotary driving tool, and the body 10 has an opposite end 14 which has a cavity 16 therein for receiving a working tool and rotating the tool.

FIG. 6 shows a fragment of a tool 20 which is rotated by the unshown driver and through the connection with the adapter as previously described.

In the arrangement shown, and as seen in FIG. 4, the collar has two diametrically disposed pins 17 extending radially therein, and the body 10 has two diametrically opposed elongated slots 18 extending therein. As such, the pins 17 and slots 18 form two pin and slot combinations, and the collar 11 is guided in its sliding motion on the body 10 by means of that pin and slot combination. A spring 19 is disposed within the body 10 and is shown to press against the pins 17 and thereby urge the collar 11 leftward, as viewed in FIGS. 1 and 4.

The interior of the collar 11 has a conical surface 21 extending therearound, and the larger diameter of the conical surface 21 is disposed leftwardly, as seen in FIG. 4, and thus with the smaller diameter of the conical surface is disposed rightwardly. The spring 19 thus urges the collar 11 in the direction from the smaller diameter surface to the larger diameter surface just mentioned. Two balls 22 are carried by the body 10 in radially disposed cylindrical holes 23, as best seen in FIG. 12. The arrangement is such that the balls 22 cannot fully move into the body cavity 16, and a slight restrictive diameter 24 can be arranged on the end of the radial holes 23 to thus preclude the balls 22 from moving completely radially inwardly into the cavity 16.

Accordingly, the balls 22 are pressed radially inwardly through sliding engagement by the conical surface 21 of the collar 11. As such, the balls 22 engage the tool 17 and thereby hold the tool relative to the adapter body 10, as desired. The drawings show the slot 18 to be extending along the body 10 and that is parallel to the axis "A" as described herein. The slot 18 has a terminal end 26 in which the pin 17 will slide. Another slot, slot 27, is formed in the body 10 and extends contiguous with and there is one extending off each slot 18 at the terminal ends 26 of the slots 18, as seen in FIGS. 7 through 10. Of course the slots 18 and 27 are in duplicate on diametrically opposite positions on the body 10. Particularly FIG. 10 shows that the slots 27 are at an acute angle relative to the body longitudinal axis "A", and that angular axis is designated "B". The actual angulation orientation for axis "B", and thus the two diametrically oppositely disposed slots 27, is approximately five degrees and they extend from the respective slot 18 and axially in the direction toward the larger diameter portion of the collar conical surface 21 and around approximately one-quarter of the circumference of the body surface 12. That is, the collar 17 can be rotated on the body 10 in the clockwise direction from FIG. 3 to move the pins 17 leftward, and, as such, the conical surface 21 presses inwardly on the balls 22, as desired for securing the tool 17 in position.

In the arrangement shown and described, the slot 18 could actually be eliminated, and there could be the pin and slot combination utilizing only the slots 27 and their respective pins 17, and the tool would be adequately pressed upon by the balls 22 and thus adequately tightly and releasably secured relative to the body 10, all as desired herein.

FIGS. 7 through 10 further show that the terminal end of each slot 27 is provided with a notch 28 which is of a semicircular size of that of the cross sectional shape of the pin 17 and is therefore adequate for snugly receiving the cross-section shape of each of the pins 17 and thus locking the pins 17 in the notch 28 and thereby requiring a specific operator maneuver to release the pins 17 from their securing position in the slots 27. Of course the spring 19 is thus urging the pins 17 into those notches 28 for the locking and final securing as shown and described herein.

Further, in the context of this invention, the slots 18 could be eliminated and utilization of only the slots 27 could remain. Thus the acute angulation designated "B" for those slots 27 could be arranged for adequate axial movement of the collar 11 relative to the body 10 in response to clockwise rotation of the collar 11, all for securing the tool, as described herein.

It will be seen and understood that the operator will perform a slight rotary action, approximately one-quarter turn, on the collar 11 relative to the adapter body 10 in order to have the collar conical surface move axially and thereby press onto the balls 22 for securing the tool. That rotary maneuvering is a specific action by the operator and therefore it is less likely that there will be an inadvertent release of the tool which can occur by a simple pulling on the collar 11 for pure axial sliding of the collar 11 on the body 10 as is now prevalent in the prior art. Also, there is a mechanical advantage in the collar rotation force because of the angulation of the slots 27 because the pins 17 are actually acting on the inclined plane presented by the angulated slots 27. Where the two pin and slots combinations of pins 17 and slots 27 are employed there is also axial alignment and stability of the collar 11 and thus firm application of the force on the balls 22 in uniform force application therebetween.

FIGS. 6 and 12 show that the tool 20 has its own conical surface 31 which is disposed adjacent the balls 22 in the shown inserted operative position for the tool 20. A taper 31 is described as being in the conical direction opposite to that of the collar tapered surface 21, and thus when the surface 21 moves leftwardly, as in these drawings, then it presses the ball 22 downwardly onto the surface 31 and thereby moves the tool 20 axially rightwardly, as in these views, and that is desired for maximum securing of the tool 20 in the adapter 10. The tool 20 is shown to have a shoulder 32 which is adjacent the end surface on the plane 33 of the body 12, and the shoulder 32 can be disposed to be drawn into contact with the surface 33 and thereby further support the tool 20. Of course it will be understood that there can be a square type of drive between the body cavity portion 16 and the tool 20 so that in the working rotation of the tool 20 there is identical rotation between the two, in a common driving relationship.

FIG. 12 thus shows the ball 22 to be slightly clear of both conical surfaces 21 and 31, for display purposes. Thus, when the pin 17 is moved in the angulated slot 27, as described previously, then the surface 21 moves leftward to press upon the ball 22 which in turn is pressed upon the tool tapered or conical surface 31. In that manner, the tool 20 is forced rightwardly, as viewed herein, and the otherwise clearance or actual slop of holding the tool 20 in the body 10 is minimized if not eliminated.

FIG. 1 shows that the collar 17 has the word "LOCK" at 34, and it also has the word "UNLOCK" at 36, and there are two arrows at 37 facing in opposite directions which conform to the rotary directions of the locking and unlocking which means that the pin 17 has moved rotationally relative to the body 10 to thereby axially displace the collar 11 in the securing action described herein. Without any force on the collar 11 from the operator, the conical surface 21 can engage the balls 22 which in turn can engage the tool 20. Rotation of the collar in the locking direction will then cause the surface 21 to press further on the balls for the most secure holding of the tool 20. Because of the angulation of the slot 27, the pin 17 will be sliding in contact with and along the planar wall 38 of the slot 27, and that produces the mechanical advantage of that inclined plane action for optimum tightening. When the collar 11 is rotated in the locking direction, it will move axially until maximum tightening is achieved.

Throughout this description, the method of securing the tool in the adapter is inherently described and it is therefore included in this invention.

Also, FIG. 11 shows the designated angles for the walls defining the slots described herein, and thus further disclosure is made with regard to the slots 27.

What is claimed is:

1. In an adapter for a driver of a rotary tool, a cylinder body having a longitudinal axis and a portion with an interior for rotationally drivingly receiving the rotary tool, a cylindrical collar co-axially and telescopically snugly disposed over said body portion and slidable on said body along said axis in a tool-locking first axial direction and in a tool-release second axial direction, a spring disposed within said body and active on said collar for yielding urging said collar in said first axial direction, said collar having an interior with a conical surface thereon centered with and faced toward said body axis, a ball on said body offset from said body axis and disposed adjacent said conical surface and being movable radially relative to said body axis and the tool by having said conical surface disposed to move onto said ball through slidable movement of said collar on said body in said first axial direction, and said body and said collar having an interlocking connection of a pin and a slot for guiding said collar in its slidable axial movement and with said slot having an elongated axis and an extent therealong disposed parallel to said body axis and a terminal end located in a direction along said slot toward said first axial direction and with said pin disposed within said slot, the improvement comprising:

said slot of said interlocking connection having a slot portion extending from and continuous with said slot extent terminal end and extending at an acute angle relative to said body axis along a line extending from said slot terminal end and angled toward said first direction, and said slot portion being disposed to receive said pin after said pin is out of said slot extent and with said slot portion and said pin thereby being arranged to have said collar slide on said body toward said first axial direction for pressing said ball toward the tool upon rotation of said collar on said body and about said body axis in a rotational direction away from said slot extent and along said slot portion and with said ball being in rolling contact with said collar conical surface for moving said collar and its said conical surface further in said first axial direction, and for releasably locking said collar relative to said body by the interlocking connection of said pin in said slot portion.

2. The adapter for a driver of a rotary tool as claimed in claim 1, including said slot portion having a distal end disposed away from said slot extent and having a notch on said distal end arranged to receive said pin upon the rotation of said collar on said body and to thereby secure said pin in said slot portion distal end.

3. The adapter for a driver of a rotary tool as claimed in claim 1, including the tool has a conical portion thereon co-axial with said body axis and disposed adjacent to said ball and being oriented opposite to the orientation of said conical surface on said collar by being disposed in its conical shape in a direction opposite to that of said conical surface.

4. In an adapter for a driver of a rotary tool, a cylinder body having a longitudinal axis and a portion with an interior for rotationally drivingly receiving the rotary tool, a cylindrical collar co-axially and telescopically snugly disposed over said body portion and slidable on said body in a direction parallel to said axis in a tool-locking first axial direction and in a tool-releasing second axial direction, a spring disposed within said body and active on said collar for yielding urging said collar in said first axial direction, said collar having an interior with a conical surface thereon centered with and faced toward said body axis, a ball on said body offset from said body axis and disposed adjacent said conical surface and being movable radially relative to said body axis and the tool by having said conical surface disposed to move onto said ball through slidable movement of said collar on said body in said first axial direction, and said body and said collar having an interlocking connection of a pin and a slot for guiding said collar in its slidable axial movement and with said pin disposed within said slot, the improvement comprising:

said slot of said interlocking connection extending at an acute angle relative to said body axis and having two spaced apart ends disposed relative to each other with one thereof relatively disposed toward the direction of said first axial direction and the other thereof relatively disposed toward the direction of said second axial direction, said slot thereby being arranged to have said collar slide on said body toward said first axial direction for pressing said ball toward the tool upon rotation of said collar on said body and about said body axis in a rotational direction toward said one spaced apart end and away from said other spaced apart end for moving said collar and its said conical surface in said first axial direction, and said one spaced-apart end having a notch contiguous thereto and extending in said first axial direction and being arranged to receive said pin upon the rotation of said collar on said body and to thereby secure said pin in said notch and secure said collar against rotation and for releasably rotationally locking said collar relative to said body and with said conical surface being against said ball.

5. The adapter for a driver of a rotary tool as claimed in claim 4, including the tool having a conical portion thereon co-axial with said body axis and disposed adjacent to said ball and being oriented opposite to the orientation of said conical surface on said collar by being disposed in its conical shape in a direction opposite to that of said conical surface.

6. A method of holding a tool in a rotary driver, the steps comprising arranging a driver body with a longitudinal axis and a cavity therein, disposing said tool in said cavity and aligned with said axis, disposing a ball on said body and arranging for radial movement of said ball toward said axis for holding said tool, disposing a collar on said body for slidable and rotational movement thereon and providing an interior conical surface on said collar facing toward said ball and placing said collar under spring influence to move said conical surface in a direction along said axis toward said ball, interconnecting said body and said collar by providing a pin and a slot in mating combination, disposing said slot at an acute angle relative to said axis and extending toward said axis and arranged to have said collar conical surface move in said direction and toward said ball upon rotation of said collar on said body and thereby hold said tool, forming, contiguous with an end of said slot in the direction of the rotation of said collar, a notch located to a side of said slot which lies in and extends along the first-mentioned direction to have said pin spring-urged into said notch, receiving said pin in said notch for releasably setting said pin and slot combination in locked relationship, and rotating said collar on said body and in rolling contact with said ball for the holding of said tool on said body.

7. The method of holding a tool in a rotary driver as claimed in claim 6, including the step of forming said tool with a conical portion and disposing said tool conical portion co-axially with said longitudinal axis and adjacent to said ball and in an orientation faced opposite to the orientation of said conical surface on said collar by having the two conical shapes disposed in directions opposite to each other, whereby movement of said collar moves said conical surface against said ball which in turn presses against said tool conical portion to secure said tool relative to said body.

* * * * *